(12) United States Patent
Murayama et al.

(10) Patent No.: US 11,721,867 B2
(45) Date of Patent: Aug. 8, 2023

(54) BATTERY MODULE AND BATTERY PACK (71) Applicant: Panasonic Intellectual Property Management Co., Ltd., Osaka (JP)

(72) Inventors: Chifumi Murayama, Osaka (JP); Shinya Motokawa, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 98 days.

(21) Appl. No.: 16/765,916

(22) PCT Filed: Feb. 18, 2019

(86) PCT No.: PCT/JP2019/005740
§ 371 (c)(1),
(2) Date: May 21, 2020

(87) PCT Pub. No.: WO2019/167689
PCT Pub. Date: Sep. 6, 2019

(65) Prior Publication Data
US 2020/0365855 A1    Nov. 19, 2020

(30) Foreign Application Priority Data
Feb. 27, 2018 (JP) .................................. 2018-032747

(51) Int. Cl.
*H01M 10/613*    (2014.01)
*H01M 10/647*    (2014.01)
(Continued)

(52) U.S. Cl.
CPC ......... *H01M 50/24* (2021.01); *H01M 10/613* (2015.04); *H01M 10/647* (2015.04);
(Continued)

(58) Field of Classification Search
CPC ........... H01M 10/0481; H01M 10/613; H01M 10/647; H01M 10/651; H01M 10/653;
(Continued)

(56) References Cited

U.S. PATENT DOCUMENTS

2009/0004553 A1\* 1/2009 Nakamura .......... H01M 50/317
429/54
2011/0159340 A1    6/2011 Hu et al.
(Continued)

FOREIGN PATENT DOCUMENTS

JP    2015-090750    5/2015
JP    2017-068986    4/2017
(Continued)

OTHER PUBLICATIONS

International Search Report of PCT application No. PCT/JP2019/005740 dated Mar. 19, 2019.

*Primary Examiner* — Lingwen R Zeng
(74) *Attorney, Agent, or Firm* — McDermott Will & Emery LLP (57) ABSTRACT

A battery module has a battery stack that includes a plurality of prismatic batteries and an inter-battery separator disposed between every two of the prismatic batteries adjacent to each other in an X direction along which the plurality of prismatic batteries is stacked. The inter-battery separator includes: a middle member having a plate shape; a first side plate-shaped member disposed on a first side of the middle member in the X direction and made of a material that is superior in thermal insulation to the middle member; and a second side plate-shaped member disposed on a second side of the middle member in the X direction and made of a material that is superior in thermal insulation to the middle member.

11 Claims, 5 Drawing Sheets

(51) Int. Cl.
*H01M 10/653* (2014.01)
*H01M 10/6555* (2014.01)
*H01M 10/6557* (2014.01)
*H01M 10/658* (2014.01)
*H01M 50/24* (2021.01)
*H01M 50/227* (2021.01)
*H01M 50/224* (2021.01)
*H01M 50/209* (2021.01)
*H01M 10/04* (2006.01)
*H01M 10/651* (2014.01)
*H01M 10/6567* (2014.01)
*H01M 10/6556* (2014.01)
*H01M 10/6551* (2014.01)

(52) U.S. Cl.
CPC ....... *H01M 10/653* (2015.04); *H01M 10/658* (2015.04); *H01M 10/6555* (2015.04); *H01M 10/6557* (2015.04); *H01M 50/209* (2021.01); *H01M 50/224* (2021.01); *H01M 50/227* (2021.01); *H01M 10/0481* (2013.01); *H01M 10/651* (2015.04); *H01M 10/6551* (2015.04); *H01M 10/6556* (2015.04); *H01M 10/6567* (2015.04); *Y02E 60/10* (2013.01)

(58) Field of Classification Search
CPC ......... H01M 10/6554; H01M 10/6555; H01M 10/6556; H01M 10/6557; H01M 10/6567; H01M 10/658; H01M 50/20; H01M 50/24; H01M 50/209; H01M 50/224; H01M 50/227; Y02E 60/10
See application file for complete search history.

(56) References Cited

U.S. PATENT DOCUMENTS

| | | |
|---|---|---|
| 2013/0120910 A1 | 5/2013 | Watanabe |
| 2013/0216884 A1 | 8/2013 | Takasaki et al. |
| 2014/0186693 A1* | 7/2014 | Tyler .................. H01M 50/103 429/186 |
| 2015/0303509 A1 | 10/2015 | Tajima |
| 2016/0197385 A1 | 7/2016 | Matsumoto et al. |
| 2019/0140237 A1 | 5/2019 | Kaye et al. |

FOREIGN PATENT DOCUMENTS

| | | |
|---|---|---|
| JP | 2019-508632 A | 3/2019 |
| WO | 2012/014353 A1 | 2/2012 |
| WO | 2012/015068 | 2/2012 |
| WO | 2014/083789 | 6/2014 |
| WO | 2015/019429 | 2/2015 |
| WO | 2017/106524 A1 | 6/2017 |

* cited by examiner

BATTERY MODULE AND BATTERY PACK

CROSS-REFERENCE TO RELATED APPLICATIONS

This application is a U.S. national stage application of the PCT International Application No. PCT/JP2019/005740 filed on Feb. 18, 2019, which claims the benefit of foreign priority of Japanese patent application 2018-032747 filed on Feb. 27, 2018, the contents all of which are incorporated herein by reference.

TECHNICAL FIELD

The present disclosure relates to a battery module that includes a plurality of prismatic batteries. The present disclosure also relates a battery pack that includes such a battery module.

BACKGROUND ART

A conventional battery module is disclosed in PTL 1. The battery module includes a battery stack, a pair of side-bind bars, and a pair of end plates. The battery stack includes a plurality of prismatic secondary batteries (hereinafter simply referred to as prismatic batteries). The plurality of prismatic batteries is arranged so as to be stacked in a direction of thickness of the prismatic batteries in a same posture. Extending in a stack direction of the batteries, the pair of the side-bind bars are disposed on both widthwise sides of the battery stack such that the battery stack is held between the side-bind bars. The pair of the side-bind bars restrain both widthwise sides of the battery stack. Meanwhile, the pair of the end plates are disposed on both sides of the battery stack in the stack direction to restrain both sides of the battery stack in the stack direction. The end plates are fixed to end faces of the pair of the side-bind bars in the stack direction by bolts or other fastening means. The battery stack, the pair of the side-bind bars, and the pair of the end plates are integrated together by this fixing means and make up the battery module.

CITATION LIST

Patent Literature

PTL 1: International Publication No. WO 2014/083789

SUMMARY OF THE INVENTION

Along with an increase in energy density of a module of prismatic batteries, a prismatic battery that has abnormally generated heat discharges a larger amount of heat. Accordingly, the larger amount of heat is conducted to a prismatic battery that is adjacent to the abnormally-heat-generating prismatic battery in a stack direction of the batteries. In response to the larger amount of heat from the abnormally-heat-generating prismatic battery, the adjacent prismatic battery is more likely to be thermally damaged.

Hence, it is an object of the present disclosure to provide a battery module that inhibits thermal damage to prismatic batteries other than a prismatic battery that has abnormally generated heat by inhibiting the conduction of heat from the abnormal prismatic battery in a battery stack direction. It is another object of the present disclosure to provide a battery pack that includes such a battery module.

A battery module according to the present disclosure, accomplished to solve the challenge described above, has a battery stack that includes a plurality of prismatic batteries stacked in a stack direction and an inter-battery separator disposed between every two of the prismatic batteries adjacent to each other in the stack direction of the plurality of prismatic batteries. The inter-battery separator includes a middle member having a plate shape, a first side plate-shaped member disposed on a first side of the middle member in the stack direction, and a second side plate-shaped member disposed on a second side of the middle member in the stack direction. The first side plate-shaped member and the second side plate-shaped member are each made of a material that is superior in thermal insulation to the middle member.

The battery module according to the present disclosure can inhibit thermal damage to the prismatic batteries other than the prismatic battery that has abnormally generated heat by inhibiting the conduction of heat from the abnormal prismatic battery in the stack direction.

DESCRIPTION OF EMBODIMENT

An exemplary embodiment of the present disclosure will be described in detail hereinafter with reference to the accompanying drawings. It is envisaged from a beginning that if a plurality of exemplary embodiments and modifications are described below, technical features of the plurality of exemplary embodiments and modifications are appropriately combined to make new exemplary embodiments. In the following description and the drawings, an X direction indicates a stack direction of a plurality of prismatic secondary batteries 31 stacked in battery stack 21, a Y direction indicates a direction orthogonal to the X direction, and a Z direction indicates a height direction of prismatic secondary batteries 31. The X direction, the Y direction, and the Z direction are orthogonal to one another. In the following description, expressions upper and upward indicate a side of prismatic secondary battery 31 on which an electrode terminal is formed in the Z direction and expressions lower and downward indicate a side of prismatic secondary battery 31 opposite the side on which the electrode terminal is formed in the Z direction. Identical elements (components) illustrated in the following drawings will be denoted by identical reference marks and will not be described redundantly. The following drawings are schematic views, and identical members between different drawings have different scale ratios in longitudinal, lateral, and height directions. In the description given herein, alloys are included in metal.

Figure 1:
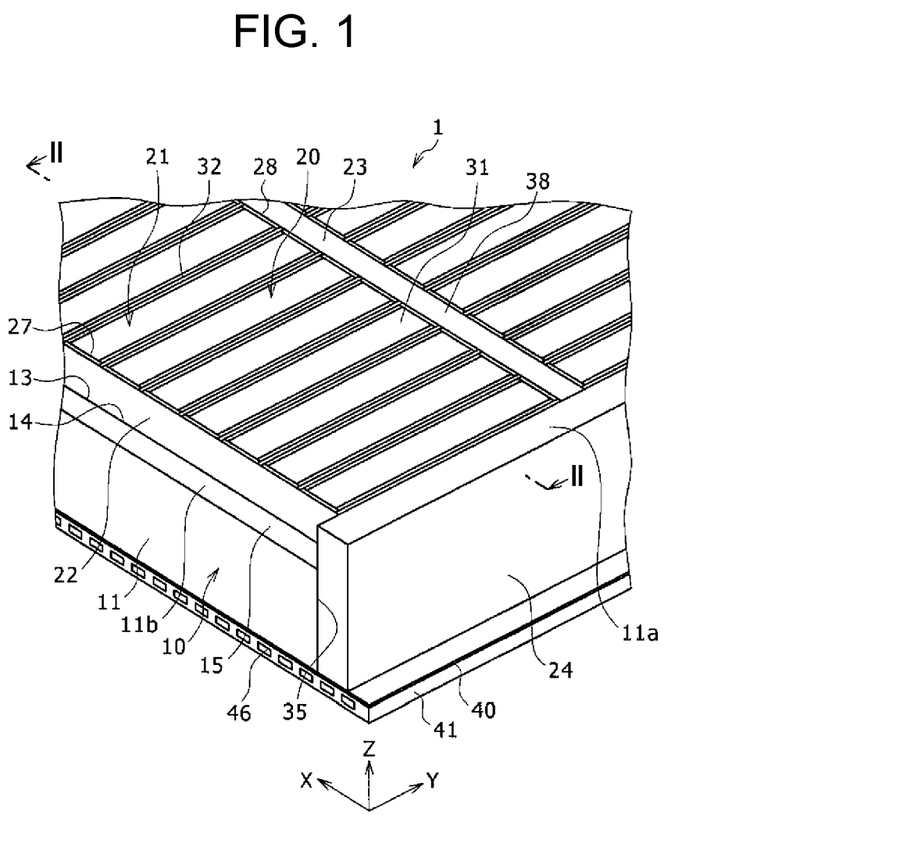
FIG. 1 is a schematic perspective view illustrating part of a battery pack according to an exemplary embodiment of the present disclosure, in a state where a lid is removed from a housing.
Figure 3:
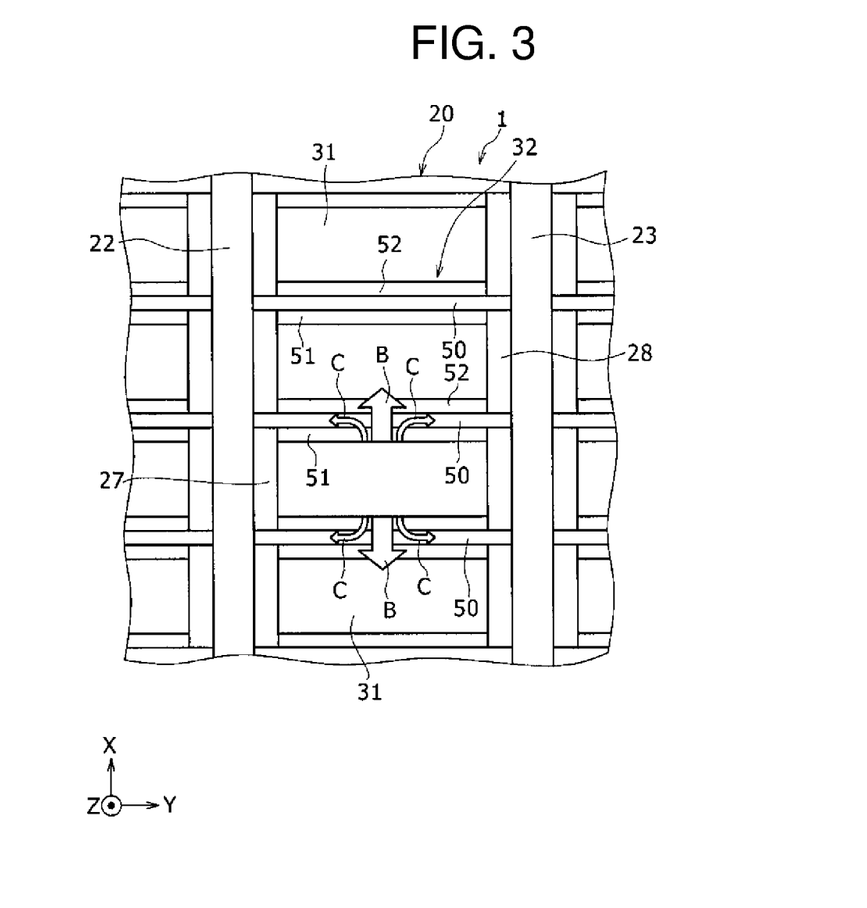
FIG. 3 is a schematic top plan view of part of the battery pack viewed along a Z direction, in a state where the lid is removed.

FIG. 1 is a schematic perspective view illustrating part of battery pack 1 according to an exemplary embodiment of the present disclosure, in a state where a lid is removed from housing 10. In FIGS. 1 and 3, illustration of electrode terminals on prismatic secondary batteries 31 (hereinafter simply referred to as prismatic batteries) is omitted. As illustrated in FIG. 1, battery pack 1 includes housing 10 and a plurality of battery modules 20. Housing 10 includes body 11, a lid (not illustrated), and a plurality of screws (not illustrated). Body 11 and the lid are each made of a metal such as aluminum or iron, or a resin. Body 11 is a box-shaped member having recess 13 of substantially rectangular-parallelepiped shape. Recess 13 includes only upper opening 14 of rectangular shape in the Z-direction. Body 11 includes upper end face 15 in the Z-direction. End face 15 includes tapped holes (not illustrated) formed at predetermined intervals.

As illustrated in FIG. 1, body 11 includes a pair of walls 11a extending in the Y direction and a pair of walls 11b extending in the X direction. Walls 11a are larger in height than walls 11b. The lid is a plate member that is rectangular in plan view. The lid is substantially equal in length in the X direction to walls 11b, and has a thickness substantially equal to a difference in height between walls 11a and walls 11b. After the plurality of battery modules 20 and the like are appropriately accommodated in recess 13, the lid is disposed between the pair of walls 11b in the X direction. The lid is disposed such that a first edge of the lid in the Y direction is substantially flush with a first edge of one of walls 11b in the Y direction and that a second edge of the lid in the Y direction is substantially flush with a second edge of the other of walls 11b in the Y direction when the lid is viewed along the Z direction. The screws (not illustrated) are then tightened to fasten the lid and the pair of walls 11b together and attach the lid to body 11. After that, body 11 with the attached lid is further covered with an external housing (not illustrated) to make up battery pack 1. The present exemplary embodiment provides walls 11a larger in height than walls 11b, but the present disclosure should not be limited to this example. Walls 11b may alternatively be larger in height than walls 11a or be equal in height to walls 11a.

As illustrated in FIG. 1, the plurality of battery modules 20 is arranged in recess 13 so as to be adjacent to each other in the Y direction. The plurality of battery modules 20 housed in recess 13 is fixed and put in place.

Battery modules 20 each include battery stack 21, first side bind bar 22, second side bind bar 23, and a pair of end plates 24. In the present exemplary embodiment, the pair of end plates 24 matches the pair of walls 11a. The pair of the end plates may not match the pair of the walls of the housing extending in the Y direction. Battery stack 21 includes the plurality of prismatic batteries (cells) 31 each having a substantially rectangular-parallelepiped shape, and a plurality of inter-battery separators 32. The plurality of prismatic (=rectangular) batteries 31 is stacked so as to be lined up and aligned along the X direction, and inter-battery separators 32 are each disposed between two prismatic batteries 31 adjacent to each other in the X direction. Examples of prismatic batteries 31 include rechargeable secondary batteries such as lithium ion batteries, nickel metal hydride batteries, and nickel-cadmium batteries, and prismatic batteries 31 each have a main surface covered with an insulating sheet like a shrink tube. Each inter-battery separator 32 is a sheet member. Inter-battery separator 32 will be described in detail later in terms of structure and material.

Each of first and second side bind bars 22, 23 is a plate member or a tube member of prismatic shape, is made of a metal such as aluminum, aluminum alloy, iron, iron alloy, or stainless steel, and extends in the X-direction. First and second side bind bars 22, 23 are restraint members used to restrain battery stack 21 including the plurality of stacked prismatic batteries 31 and are components that constitute part of housing 10. First and second side bind bars 22, 23 serve to ensure rigidity of housing 10 against reaction force of prismatic batteries 31 that constitute battery stack 21. First and second side bind bars 22, 23 are an example of side heat radiators. First and second side bind bars 22, 23 each have a length in the X direction slightly longer than a length in the X direction of battery stack 21. First side bind bar 22 restrains a first side of battery stack 21 in the Y direction, whereas second side bind bar 23 restrains a second side of battery stack 21 in the Y direction. End plates 24 are plate members made of a metal such as aluminum or iron, and extend in the Y direction. End plate 24 disposed on a first side in the X direction restrains a first side of battery stack 21 in the X direction, whereas end plate 24 disposed on a second side in the X direction restrains a second side of battery stack 21 in the X direction.

Each of first and second side bind bars 22, 23 has both end surfaces 35 in the X direction that are each provided with a tapped hole (not illustrated) extending in the X direction to fix an end plate, and each of end plates 24 is provided with through holes (screw holes). Each of battery modules 20 further includes end separators (not illustrated), a plurality of first side separators 27, and a plurality of second side separators 28.

The end separators, first side separators 27, and second side separators 28 are sheet members made of an insulating material such as a resin. Preferably, first side separators 27 and second side separators 28 are made of an insulating material having excellent thermal conductivity. The end separators are disposed between a first end of battery stack 21 in the X direction and end plate 24 disposed on the first side, and between a second end of battery stack 21 in the X direction and end plate 24 disposed on the second side.

First side separators 27 are disposed between a first end of battery stack 21 in the Y direction and first side bind bar 22, whereas second side separators 28 are disposed between a second end of battery stack 21 in the Y direction and second side bind bar 23. The plurality of first side separators 27 is disposed at intervals in the X direction, and the plurality of second side separators 28 is disposed at intervals in the X direction. The plurality of first side separators 27 and the plurality of second side separators 28 will be described in detail later in terms of disposition and configuration with reference to FIG. 3.

The end separators are disposed between both ends of battery stack 21 in the X direction and respective end plates 24, and side separators 27, 28 are disposed between the respective ends of battery stack 21 in the Y direction and side bind bars 22, 23. The screws are then tightened into the through holes in end plates 24 and the tapped holes in side bind bars 22, 23 from outside in the X direction of end plates 24. With the tightened screws, battery stack 21, first and second side bind bars 22, 23, the pair of end plates 24, the two end separators, the plurality of first side separators 27, and the plurality of second side separators 28 are integrated into battery module 20.

Prismatic batteries 31 in each battery stack 21 have first side surfaces in the Y direction restrained by first side bind bar 22 to be positioned substantially on an identical plane, and second side surfaces in the Y direction restrained by second side bind bar 23 to be positioned substantially on an identical plane. The pair of end plates 24 on the first and second sides may be pressed from both sides by means of a press (not illustrated), and the pair of end plates 24 compressing battery stacks 21 may be screwed to side bind bars 22, 23 to constitute battery modules 20.

Regarding two battery stacks 21 adjacent to each other in the Y direction according to the exemplary embodiment relating to FIG. 1, second side bind bar 23 disposed on the second Y direction side of battery stack 21 on the first side in the Y direction and first side bind bar 22 disposed on the first Y direction side of battery stack 21 on the second side in the Y direction are each made up of identical common side bind bar 38. Regarding the two battery stacks adjacent to each other in the Y direction, the second side bind bar disposed on the second Y direction side of the battery stack on the first side in the Y direction and the first side bind bar disposed on the first Y direction side of the battery stack on the second side in the Y direction may not be integrated but be formed independently from each other.

In the exemplary embodiment illustrated in FIG. 1, first end plate 24 is a single common end plate shared by the plurality of battery modules 20 that are aligned along the Y direction. Thus, first end plate 24 restrains the first X direction sides of battery stacks 21 of battery modules 20. Second end plate 24 is a single common end plate shared by the plurality of battery modules 20 and thus restrains the second X direction sides of battery stacks 21 of battery modules 20. The plurality of battery modules aligned along the Y direction may not share the single common first end plate but may be each provided with a first end plate configured to restrain only the first side of each of the battery stacks in the X direction. Similarly, the plurality of battery modules aligned along the Y direction may not share the single common second end plate but may be each provided with a second end plate configured to restrain only the second side of each of the battery stacks in the X direction.

Battery stack 21 may include, as described above, an end separator disposed between prismatic battery 31 at the first end in the X direction and first end plate 24 to fill a gap between prismatic battery 31 at the first end and first end plate 24, and may include an end separator disposed between prismatic battery 31 at the second end in the X direction and second end plate 24 to fill a gap between prismatic battery 31 at the second end and second end plate 24. The end separators thus configured may have elasticity. In this case, even if there is any change in size of the gap between prismatic battery 31 at an end in the X direction and at least one of first and second end plates 24, the end separators can readily fill the gap between prismatic battery 31 at the end in the X direction and the at least one of first and second end plates 24. This configuration provides close fitting of battery stack 21 in the X-direction and thus is preferable.

With continuous reference to FIG. 1, the housing according to the present exemplary embodiment includes a bottom plate having heat transfer sheet 40 and cooling plate 41 made of a metal such as aluminum or an aluminum alloy. Cooling plate 41 is an example of a lower heat radiator made of a metal. Heat transfer sheet 40 is made up of a sheet member exhibiting insulation and excellent thermal conductivity, such as an epoxy resin sheet or a silicone rubber sheet. Heat transfer sheet 40 has a rectangular shape identical to a shape of cooling plate 41 in a plan view, is disposed on an upper surface of cooling plate 41 adjacent to battery modules 20, and is held between cooling plate 41 and walls 11a, 11b. For instance, screws are put into cooling plate 41, heat transfer sheet 40, and walls 11a, 11b from below cooling plate 41 and are tightened to fix cooling plate 41 and heat transfer sheet 40 to walls 11a, 11b.

Although not described in full detail, cooling plate 41 includes a plurality of coolant passages 46. The plurality of coolant passages 46 is disposed at intervals in the X direction, and coolant passages 46 each extend from a first end to a second end in the Y direction of cooling plate 41. For instance, a coolant (a refrigerant) such as water provided with fluid power by a pump or the like (not illustrated) flows through each coolant passage 46. The flow of the coolant cools cooling plate 41, and cooled cooling plate 41 cools prismatic batteries 31. The cooling of prismatic batteries 31 inhibits thermal degradation of prismatic batteries 30.

Figure 2:
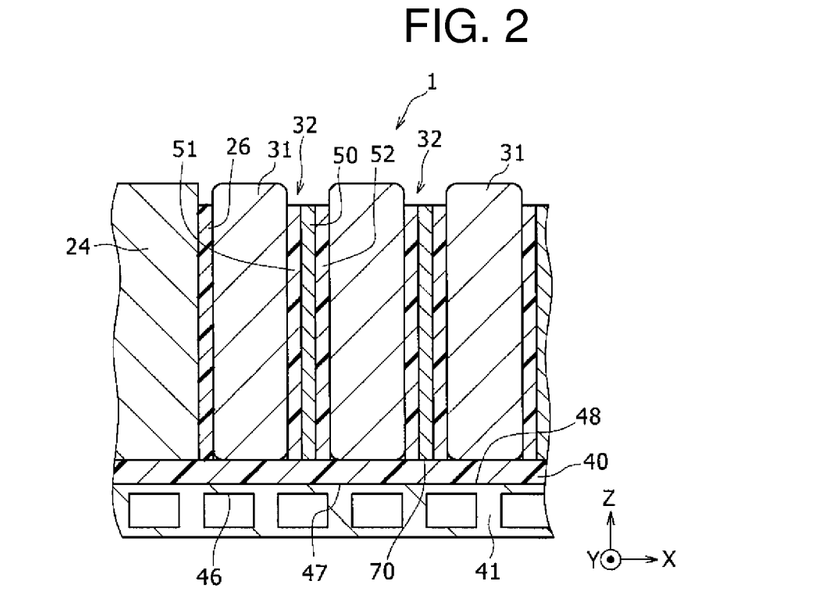
FIG. 2 is a schematic cross-sectional view of part of the battery pack taken along line II-II of FIG. 1.

FIG. 2 is a schematic cross-sectional view of part of the battery pack taken along line II-II of FIG. 1. FIG. 3 is a schematic top plan view of part of battery pack 1 viewed along the Z direction, in a state where the lid is removed. In FIG. 2, reference numeral 26 denotes the end separator. As illustrated in FIGS. 2 and 3, inter-battery separator 32 includes middle member 50, first side member 51, and second side member 52. As illustrated in FIG. 2, middle member 50 is a plate-shaped (sheet-shaped) member disposed such that a thickness direction of the member is aligned along the X direction. First side member 51 is a plate-shaped (sheet-shaped) member disposed such that a thickness direction of the member is aligned along the X direction. First side member 51 is disposed on a first side of middle member 50 in the X direction and is made of a material that is superior in thermal insulation to middle member 50.

Second side member 52 is a plate-shaped (sheet-shaped) member disposed such that a thickness direction of the member is aligned along the X direction. Second side member 52 is disposed on a second side of middle member 50 in the X direction and is made of a material that is superior in thermal insulation to middle member 50. Second side member 52 is the same as first side member 51. In other words, first and second side members 51 and 52 are made of an identical material and are identical to each other in a dimension (thickness) in the X direction, a dimension (width) in the Y direction, and a dimension (height) in the Z direction. A second surface of first side member 51 in the X direction is in contact with a first surface of middle member 50 in the X direction, whereas a first surface of second side member 52 in the X direction is in contact with a second surface of middle member 50 in the X direction.

Middle member 50 is made of a material having high thermal conductivity, such as aluminum (a thermal conductivity from 229.04 W/m·K to 256.05 W/m·K), aluminum alloy, or a light metal other than aluminum, or other metals such as iron (a thermal conductivity from 60 W/m·K to 80 W/m·K), iron alloy, stainless steel (a thermal conductivity from 16 W/m·K to 19 W/m·K), or graphite (a graphite sheet). Meanwhile, first and second side members 51, 52 are made of a material having thermal conductivity lower than that of middle member 50 and exhibiting thermal insulation superior to that of middle member 50. The material is, for example, a resin such as polypropylene (PP) (a thermal conductivity from 0.17 W/m·K to 0.19 W/m·K), polybutylene terephthalate (PBT) (a thermal conductivity of 0.25 W/m·K), or polycarbonate (PC) (a thermal conductivity of 0.19 W/m·K), which are each used as a general inter-battery separator, or NASBIS (trademark, Nano Silica Balloon Insulator Sheet), a non-woven fabric, glass wool (a thermal conductivity of 0.04 W/m·K), rock wool, a cellulose fiber, urethane foam (a thermal conductivity of 0.021 W/m·K), phenolic foam, polyurethane foam (a thermal conductivity of 0.03 W/m·K), polystyrene (a thermal conductivity of 0.03 W/m·K), cellular rubber, aerogel, or fumed silica. Preferably, the material for use in first and second side members 51, 52 is a material that is superior in thermal insulation to resins because of an expected enhanced thermal insulation effect. A heat insulating material made of a material that is superior in thermal insulation to resins has a structure in which a nanoporous substance such as silica aerogel is supported in cavities of a fiber sheet or another structural material made of non-woven fabric or the like. NASBIS (a thermal conductivity of 0.02 W/m·K) is an example of such a heat insulating material. Even if prismatic batteries 31 is each covered with a film having an insulation property, first and second side members 51, 52 preferably have an insulation property. This instance reliably provides insulation between prismatic batteries 31 adjacent to each other in the X direction.

If middle member 50 is made of aluminum or aluminum alloy and first and second side members 51, 52 are each made of a heat insulating material having, for example, a structure in which a nanoporous substance is supported in cavities of a fiber sheet, it is preferred that a thickness of middle member 50 in the X direction range from 30% to 50% inclusive of a sum of a thickness of first side member 51 in the X direction and a thickness of second side member 52 in the X direction. More preferably, the thickness of middle member 50 in the X direction is approximately three-sevenths (≈0.43) of a sum of the thicknesses of first and second side members 51 and 52 in the X direction, and it is, for example, more preferred that the thickness of middle member 50 in the X direction range from 40% to 46% inclusive of a sum of the thicknesses of first and second side members 51 and 52 in the X direction. However, the thickness of middle member 50 in the X direction may be less than 20% or greater than 50% of a sum of the thicknesses of first and second side members 51 and 52 in the X direction.

As illustrated in FIG. 2, lower end 70 of middle member 50 is in contact with heat transfer sheet 40, and lower surface 47 of heat transfer sheet 40 is in contact with upper surface 48 of cooling plate 41. In other words, middle member 50 is thermally coupled to cooling plate 41, a lower heat radiator, through heat transfer sheet 40. This configuration allows heat conducted to middle member 50 to be discharged downward to cooling plate 41 through heat transfer sheet 40 and allows the heat from middle member 50 to diffuse widely into battery pack 1 through cooling plate 41. This inhibits any local area in battery pack 1 from reaching a high temperature.

In some cases, it is preferred that a middle member and a cooling plate be not thermally coupled to each other. Specifically, in some cases, after the transfer of heat from a prismatic battery that has abnormally generated heat to a middle member, a substantial degree of heat is transferred from a lower part of the middle member to a cooling plate. In such a case, the substantial degree of heat is readily transferred from the middle member to a prismatic battery adjacent to the abnormal prismatic battery through the cooling plate. This facilitates thermal damage to the prismatic battery adjacent to the abnormal prismatic battery. Thus, in such a case, it is preferred that the middle member be not thermally coupled to the cooling plate to reduce an amount of heat conducted between the adjacent prismatic batteries. Even in this case, lower ends of first and second side members may be put into contact with a heat transfer sheet. For instance, the dimension of the middle member in the Z direction may be made smaller than the dimension of each of the first and second side members in the Z direction and upper ends of the middle member and the first and second side members of the inter-battery separator (ends opposite the cooling plate in the Z direction) may be lined up such that only a lower end of the middle member except the lower ends of the other members of the inter-battery separator is separated from the heat transfer sheet. This provides a configuration in which only the middle member is not thermally coupled to the cooling plate.

As illustrated in FIG. 3, the plurality of first side separators 27 is disposed at intervals along the X direction and the plurality of second side separators 28 is disposed at intervals along the X direction. First and second side separators 27, 28 extend in the X direction. A first surface of each first side separator 27 in the Y direction is in contact with a second surface of first side bind bar 22 in the Y direction, whereas a second surface of each second side separator 28 in the Y direction is in contact with a first surface of second side bind bar 23 in the Y direction.

Sheet-shaped middle member 50 extends in the Y direction. A first end of middle member 50 in the Y direction is in contact with the side surface of first side bind bar 22, and a second end of middle member 50 in the Y direction is in contact with the side surface of second side bind bar 23. Middle members 50 are held between first side bind bar 22 and second side bind bar 23 in the Y direction. The first Y direction end of middle member 50 is held between two first side separators 27 adjacent to each other in the X direction, and the second Y direction end of middle member 50 is held between two second side separators 28 adjacent to each other in the X direction. Meanwhile, first and second side members 51, 52 are each held between first side separator 27 and second side separator 28 in the Y direction. First and second side separators 27 and 28 are disposed primarily to ensure a function of insulating first and second side bind bars 22 and 23 from prismatic batteries 31. Hence, first and second side separators 27 and 28 are usually insulators made of a material such as a resin. A gap (a space) may be made between each of the first and second side bind bars and the prismatic batteries to insulate the first and second side bind bars from the prismatic batteries.

A first surface of first side member 51 in the Y direction is in contact with a second surface of prismatic battery 31 in the Y direction, and a second surface of first side member 51 in the Y direction is in contact with a first surface of middle member 50 in the Y direction. A second surface of second side member 52 in the Y direction is in contact with a first surface of prismatic battery 31 in the Y direction, and a first surface of second side member 51 in the Y direction is in contact with a second surface of middle member 50 in the Y direction.

In the present exemplary embodiment, the first surface of middle member 50 in the Y direction is in direct contact with and thermally coupled to first side bind bar 22 acting as a side heat radiator, and the second surface of middle member 50 in the Y direction is in direct contact with and thermally coupled to second side bind bar 23 acting as a side heat radiator. This allows heat conducted to middle member 50 in a direction of arrow B to be partly conducted in a direction of arrow C (in the Y direction) and be efficiently radiated to first and second side bind bars 22, 23. This allows heat that has reached middle member 50 to be diffused into a large region of the battery pack through first and second side bind bars 22, 23. Prismatic batteries 31 adjacent to each other in the stack direction are thermally insulated from each other by first and second side members 51, 52 of inter-battery separator 32 and this reduces the amount of heat conducted between adjacent prismatic batteries 31. Heat conducted to first and second side members 51, 52 are conducted to first and second side bind bars 22, 23 through middle member 50. This configuration can effectively reduce the amount of heat conducted between adjacent prismatic batteries 31, a largest amount of heat conduction in the battery pack, and as a result inhibit any local area in battery pack 1 from reaching a high temperature. In some cases, it is preferred that middle members 50 and cooling plate 4 be not thermally coupled together if middle members 50 are thermally coupled to first and second side bind bars 22, 23 as in the present exemplary embodiment.

Figure 4:
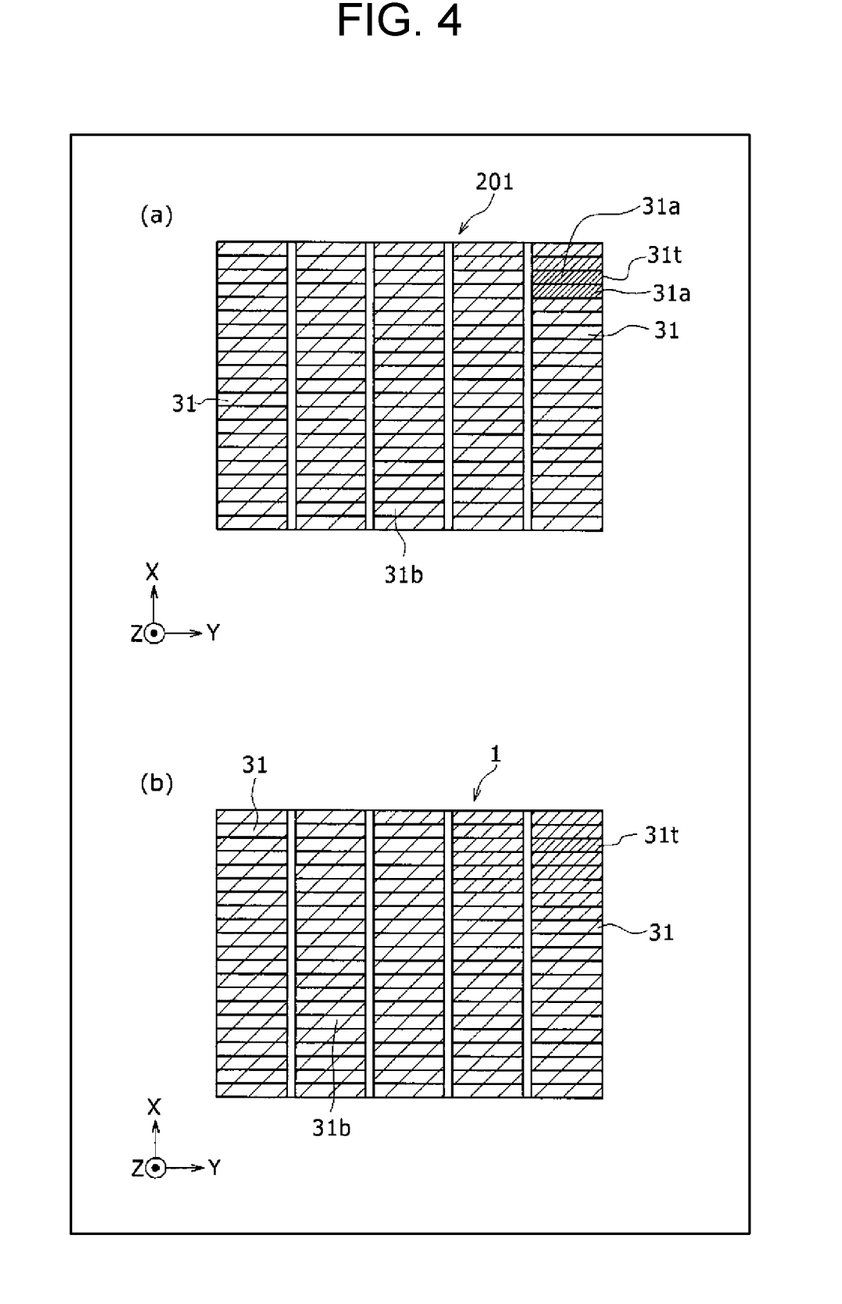
FIG. 4 illustrates an example of computer simulation results to show how heat diffuses in a battery pack of a reference example and how heat diffuses in a battery pack of the present disclosure in response to occurrence of a prismatic battery that has abnormally generated heat.

FIG. 4 are drawings illustrating an example of computer simulation results to show how heat diffuses in battery pack 201 of a reference example and how heat diffuses in battery pack 1 of the present disclosure in response to occurrence of trigger cell 31*t*, a prismatic battery that has abnormally generated heat.

In battery pack 201 of the reference example, an inter-battery separator disposed between prismatic batteries 31 adjacent to each other in the X direction is made up of a single layer sheet-shaped heat insulating material having a thermal conductivity of 0.02 W/m·K and a thickness of 2 mm. First and second side separators disposed along first and second side bind bars 22, 23 are each made up of a single sheet-shaped member, and the inter-battery separator is held not between first and second side bind bars 22, 23 but between the first and second side separators. Meanwhile, in battery pack 1 on which a computer simulation is performed, an inter-battery separator disposed between prismatic batteries 31 adjacent to each other in the X direction has a three-layer structure in which a heat transfer component made of an aluminum-made plate member is held between two sheet-shaped heat insulating materials with a thermal conductivity of 0.02 W/m·K. A thickness of each of the heat insulating materials and the heat transfer component is set to 1 mm.

In FIGS. 4(*a*) and 4(*b*), a density of oblique lines represents a temperature. Specifically, in FIGS. 4(*a*) and 4(*b*), a high density of oblique lines indicates a high temperature. Two prismatic batteries 31*a* with a highest density of oblique lines in FIG. 4(*a*) have a temperature of 160° C., whereas prismatic batteries 31*b* with a lowest density of oblique lines in FIGS. 4(*a*) and 4(*b*) have a temperature of around 60° C. In battery pack 201 of the reference example, one of two prismatic batteries 31*a* with the highest density of oblique lines is trigger cell 31*t*.

In battery pack 201 of the reference example, as illustrated in FIG. 4(*a*), the temperature of one prismatic battery 31*a* adjacent to trigger cell 31*t* in the X direction reaches 160° C., a temperature level similar to that of trigger cell 31*t*, and prismatic batteries 31*b* with the lowest temperature are in an expanded region. This demonstrates that heat generated from trigger cell 31*t* is readily trapped in a vicinity of trigger cell 31*t* and the local area readily reaches a high temperature. Prismatic battery 31*a* adjacent to trigger cell 31*t* in the X direction, in particular, is readily subject to thermal damage caused by heat from trigger cell 31*t*.

In comparison to battery pack 201 of the reference example, in battery pack 1 according to the present disclosure, as illustrated in FIG. 4(*b*), a plurality of prismatic batteries 31 disposed in an area surrounding trigger cell 31*t* reaches high temperatures. This decreases a region where prismatic batteries 31*b* with the lowest temperature are present. However, unlike battery pack 201, battery pack 1 has no prismatic batteries 31*a* that reach a high temperature of 160° C. and even the temperature of trigger cell 31*t* is below 160° C. The temperature of prismatic battery 31 adjacent to trigger cell 31*t* in the X direction is considerably low as compared with that in battery pack 201 of the reference example. Hence, battery pack 1 allows heat generated by trigger cell 31*t* to be diffused into an expanded region and inhibits or prevents the generation of a local area that reaches a high temperature. As a result, battery pack 1 is able to inhibit or prevent thermal damage to prismatic batteries 31 other than trigger cell 31*t*.

Figure 5:
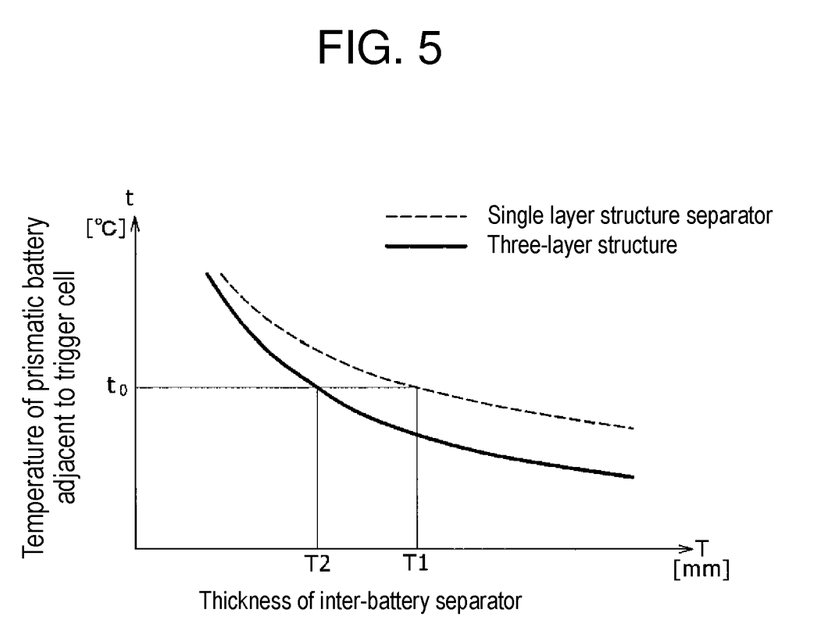
FIG. 5 is a graph illustrating a relationship, formed in an example test, between temperature of a prismatic battery adjacent along an X direction to a prismatic battery that has abnormally generated heat and thickness of an inter-battery separator.

FIG. 5 is a graph illustrating a relationship, formed in an example test, between temperature t of a prismatic battery adjacent along the X direction to a prismatic battery that has abnormally generated heat (hereinafter referred to as a trigger cell) and thickness T of an inter-battery separator. In FIG. 5, a curve indicated with a dotted line is data for the inter-battery separator made up of a single layer sheet-shaped heat insulating material. Another curve indicated with a solid line is data for the inter-battery separator made up of a sheet-shaped member having a three-layer structure in which both sides of a heat transfer component are held between two layers of a sheet-shaped heat insulating material identical to the material for the data indicated with the dotted line. If the inter-battery separator has the three-layer structure, the layers of the heat transfer component and the heat insulating material satisfy (thickness of heat transfer component)/(thickness of one layer of heat insulating material)=6/7 and (thickness of heat transfer component)/(sum of thicknesses of two layers of heat insulating material)=3/7. Although being variable depending on specifications of prismatic battery 31, t0(° C.) is a temperature set as a criterion for indicating risk of thermal damage to prismatic battery 31. If t0 is less than or equal to 160° C., heat abnormally generated by trigger cell 31*t* in FIG. 4 is transmitted to prismatic battery 31*a* adjacent to trigger cell 31*t* in the X direction.

In the example test shown in FIG. 5, the inter-battery separator made up of the single-piece one-layer heat insulating material does not allow temperature of the prismatic battery adjacent to the trigger cell in the X direction to fall below t0 and cannot effectively inhibit thermal damage to the adjacent prismatic battery unless the inter-battery separator has a thickness of greater than or equal to T1 (mm). In contrast, the inter-battery separator made up of the sheet-shaped member of the three-layer structure allows temperature of the prismatic battery adjacent to the trigger cell in the X direction to fall below t0 and can effectively inhibit thermal damage to the adjacent prismatic battery with proviso that the inter-battery separator has a thickness of greater than or equal to T2 (mm) (<T1). In this regard, it was confirmed that if the sheet-shaped inter-battery separator of the three-layer structure according to the present disclosure includes a heat transfer component made of aluminum and layers of a heat insulating material made of NASBIS, the thickness of the inter-battery separator can be decreased to around 74% of the thickness of an inter-battery separator made of one layer of NASBIS. The inter-battery separator of the three-layer structure can have a marked effect of decreased thickness if the thickness of the middle member ranges from 30% to 50% inclusive of a sum of the thicknesses of first and second side members 51 and 52 in the X direction.

Battery module 20 according to the present disclosure, as described above, has battery stack 21 that includes a plurality of stacked prismatic batteries 31 and inter-battery separator 32 disposed between every two of the plurality of prismatic batteries 31 adjacent to each other in the X direction. Inter-battery separator 32 includes middle member 50 having a plate shape, first side plate-shaped member 51 disposed on a first side of middle member 50 in the X direction, and second side plate-shaped member 52 disposed on a second side of middle member 50 in the X direction. First side member 51 and second side member 52 are each made of a material that is superior in thermal insulation to middle member 50.

Thus, inter-battery separator 32 has at least a three-layer structure in which first and second side members 51, 52 exhibiting high thermal insulation are disposed on both sides of highly thermal conductive middle member 50 in the X direction. This configuration allows heat that has reached middle member 50 to be conducted to a component other than first and second side members 51, 52 that middle member 50 is in contact with and be effectively dispersed through the component. As a result, the battery module can reduce heat conducted from the trigger cell to prismatic battery 31 adjacent to the trigger cell in the X direction and inhibit thermal damage to adjacent prismatic battery 31.

Inter-battery separator 32 has the three-layer structure in which middle member 50 having excellent thermal conductivity is disposed at a middle. This configuration allows heat to be radiated from middle member 50 to a component other than prismatic batteries 31, and as a result provides an improvement in thermal insulation between prismatic batteries 31 adjacent to each other in the X direction. As a result, inter-battery separator 32 can be made thinner in thickness and be made more compact in dimension in the X direction. This enables an increase in energy densities of the battery module and the battery pack.

Further, this configuration allows heat to be radiated from middle member 50, which is disposed at the middle of inter-battery separator 32 in the X direction, to a component other than prismatic batteries 31 and allows heat that has reached middle member 50 to be dispersed into a large region of the battery pack. Thus, heat generated during normal charging or discharging of prismatic batteries 31 can be diffused into a large region. This helps make heat largely uniform and contributes to an increased cooling effect. As a result, the battery module can reduce the maximum temperature of prismatic batteries 31 during normal charging or discharging and inhibit thermal degradation of prismatic batteries 31.

The battery module may include first and second side metal-made bind bars 22, 23 being disposed at sides of battery stack 21 in the Y direction and extending substantially parallel to the X direction. Middle members 50 may be put into contact with first and second side bind bars 22, 23.

According to the configuration described above, heat conducted to middle member 50 can be efficiently radiated to first and second side bind bars 22, 23 and be diffused into a large region of the battery pack through first and second side bind bars 22, 23 having a large capacity. This configuration can effectively reduce the amount of heat conducted to prismatic battery 31 that is adjacent to the trigger cell in the X direction and inhibit or prevent thermal damage to adjacent prismatic battery 31. The diffusibility of heat conducted to middle member 50 into the large region contributes to an increase in the effect of thermal insulation between two prismatic batteries 31 adjacent to each other in the X direction and to a further decrease in thickness of inter-battery separator 32. This configuration helps make heat in the large region uniform and thus further increase the effect of inhibiting thermal degradation of prismatic batteries 31 during charging or discharging.

The side heat radiator may be made up of first and second side bind bars 22, 23 that restrain battery stack 21.

According to the configuration described above, the members configured to ensure rigidity of housing 10 against reaction force of prismatic batteries 31 that constitute battery stack 21 can also serve as a heat sink for heat radiation. This allows battery pack 1 to be made compact.

The battery module may include an external terminal disposed on an upper side of each of prismatic batteries 31 in the Z direction, in which the prismatic batteries are included in battery stack 21, and may include cooling plate 41 disposed at a lower side of battery stack 21 in the Z direction. Middle members 50 may be thermally coupled to cooling plate 41 through heat transfer sheet 40.

According to the configuration described above, heat conducted to middle member 50 can be efficiently radiated to cooling plate 41 through heat transfer sheet 40 and be diffused into a large region of the battery pack through cooling plate 41 having a large capacity. This configuration can inhibit or prevent thermal damage to prismatic battery 31 adjacent to the trigger cell in the X direction and contribute to a further decrease in thickness of inter-battery separator 32. This configuration helps increase the effect of reducing the maximum temperature during charging or discharging and further increase the effect of inhibiting thermal degradation of prismatic batteries 31.

The battery module may include first and second side separators 27, 28 that are between two middle members 50 adjacent to each other in the X direction and that are disposed along surfaces of first and second side bind bars 22, 23 adjacent to battery stack 21. First and second side members 51, 52 may be each put into contact with first and second side separators 27, 28.

When the middle member is put into contact with the first and second side bind bars, the contact is likely to cause uneven surfaces near areas of the contact. Thus, the first and second side members are less likely to be put into intimate contact with the first and second side bind bars. In response to this problem, in this configuration, first and second side separators 27, 28 are disposed along the surfaces of first and second side bind bars 22, 23 adjacent to battery stack 21, and first and second side members 51, 52 are disposed so as to be put into contact with first and second side separators 27, 28. This configuration allows first and second side members 51, 52 to be readily disposed in battery module 20 and facilitates manufacture of battery module 20.

Middle member 50 may be made of aluminum, aluminum alloy, or a graphite sheet, and first and second side members 51, 52 may be each made of a heat insulating material that is lower in thermal conductivity than resin material.

The configuration described above can effectively inhibit heat conduction in the X direction and effectively inhibit thermal damage to prismatic batteries 31 other than the trigger cell. This helps to reduce in thickness of inter-battery separator 32.

A thickness of first side member 51 in the X direction may be substantially equal to a thickness of second side member 52 in the X direction. A thickness of middle member 50 in the X direction may range from 30% to 50% inclusive of a sum of the thicknesses of first and second side members 51, 52 in the X direction.

The configuration described above can have a marked effect on the inhibition of heat conduction in the X direction and inhibition of thermal damage to prismatic batteries 31 other than the trigger cell. This configuration can also have a marked effect on reduction of the thickness of inter-battery separator 32.

Battery pack 1 may have housing 10 to house battery stack 21 including a plurality of stacked prismatic batteries 31, in which part of a component of housing 10 is equivalent to first and second side bind bars 22, 23 that restrain battery stack 21, and middle members 50 are thermally coupled to first and second side bind bars 22, 23.

Battery pack 1 according to the configuration described above is made compact and is able to inhibit heat conduction in the X direction and inhibit thermal damage to prismatic batteries 31 other than the trigger cell.

The present disclosure should not be limited to the exemplary embodiment described above and variations of the exemplary embodiment described above, but the present disclosure is variously modified or varied within the scope of matters recited in the appended claims or equivalents of the appended claims.

For instance, in the exemplary embodiment described above, middle member 50 of inter-battery separator 32 is put into thermal contact with cooling plate 41, which is disposed below battery stack 21 in the Z direction, through heat transfer sheet 40. However, the middle member of the inter-battery separator may be put into direct contact with an upper heat radiator made of a metal and disposed above the battery stack in the Z direction or be thermally coupled to the upper heat radiator through a component. If the middle members are put into thermal contact with the upper heat radiator through a component, it is preferred that the component be made of an insulating sheet having high thermal conductivity to provide both insulation and satisfactory heat radiation performance. The upper heat radiator made of a metal is, for example, a metal-made lid for the housing. This modified example can also inhibit or prevent thermal damage to the prismatic battery adjacent to the trigger cell in the X direction and allows the inter-battery separator to have a decreased thickness. This configuration also contributes to an enhanced effect on reduction of the maximum temperature during charging or discharging and an enhanced effect on inhibition of thermal degradation of prismatic batteries. No component may be present between the middle members and the lid of the housing. The housing (including the lid) may be made of a material, such as a resin, other than metal.

In the description given above, the side heat radiator is made up of side metal-made bind bars 22, 23, for example. However, the side heat radiator that the middle member of the inter-battery separator is put into contact with may be a metal-made cooling plate extending along the X direction and having a coolant passage that enables a coolant to flow through and that extends along the X direction. Alternatively, the middle member of each of the inter-battery separators may not be put into direct contact with each of the side metal-made bind bars or the metal-made cooling plate, and all the middle members included in the battery stack may be put into contact with a single one-body side separator extending along the X direction. Then, the middle members may be thermally coupled to each of the side metal-made bind bars or the metal-made cooling plate through the side separator, and in this case, the side separator can be installed readily and at a low cost. Any metal-made component extending along the X direction may not be present at a side of the battery stack in the Y direction. Specifically, the first and second side bind bars may be components made of plastic such as carbon fiber reinforced plastic (CFRP), other than the metal-made components, if weight reduction takes priority over heat radiation.

In the description given above, the lower heat radiator made of a metal is cooling plate 41, and middle members 50 are thermally coupled to metal-made cooling plate 41 through heat transfer sheet 40, for example. However, the middle members may be put into direct contact with the metal-made cooling plate. Alternatively, as described above, the middle members may not be thermally coupled to the cooling plate. The metal-made lower heat radiator may be a bottom plate of a housing made of a metal and the middle members may be put into direct contact with the bottom plate or may be thermally coupled to the bottom plate through a component such as a heat transfer sheet having an insulating property. Alternatively, as described above, the housing may be made of a material such as a resin other than metal, and the metal-made lower heat radiator may not be present.

In the description given above, first and second side members 51 and 52 are identical to each other, for example. However, the first and second side members may be made of respective different materials and may differ in thickness.

In the description given above, inter-battery separator 32 has the three-layer structure, for example. However, the inter-battery separator may have a structure composed of four or more layers.

In the description given above, the batteries included in battery stack 21 are prismatic batteries 31 having a rectangular outer shape, for example. However, the batteries included in the battery stack may be any batteries, such as pouch batteries (pouch cells) or cylindrical batteries (cylindrical cells), other than prismatic batteries.

In the description given above, inter-battery separator 32 is disposed between every two prismatic batteries 31 adjacent to each other in the X direction, in battery stack 21, for example. However, in a battery stack, an inter-battery separator may not be disposed between every two prismatic batteries adjacent to each other in the X direction with proviso that the inter-battery separator is disposed between at least one pair of the two prismatic batteries adjacent to each other in the X direction. For instance, an inter-battery separator may be disposed between every alternate two prismatic batteries adjacent to each other in the X direction, in a battery stack.

In the description given above, middle member 50, first side member 51, and second side member 52 are each shaped like a plate (a sheet), for example. However, the middle member, the first side member, and the second side member may not be plate-shaped (sheet-shaped) members but may be bar-shaped members. The bar-shaped middle member, the bar-shaped first side member, and the bar-shaped second side member may be arranged in the stack direction to constitute an inter-battery separator. Alternatively, the middle member, the first side member, and the second side member may have any shape other than plate- and bar-shapes.

In the description given above, battery module 20 includes first and second side bind bars 22, 23 to restrain battery stack 21, for example. However, in the battery pack, the body of the housing except the lid may have a partition (a division) that separates different battery stacks from each other and that is joined to side walls of the body.

The middle member of the inter-battery separator may be a sheet-shaped member made of a carbon fiber reinforced plastic (CFRP) of a unidirectional (UD) type that contains carbon fibers extending in an identical direction. A property of such a carbon fiber reinforced plastic is such that the thermal conductivity in one direction is higher than the thermal conductivity in a direction orthogonal to the one direction. Thus, if the middle member is put into contact with the side heat radiator, the sheet-shaped member is preferably disposed such that the thermal conductivity in the Y direction is highest and is higher than the thermal conductivity in the Z direction.

The invention claimed is:

1. A battery module comprising a battery stack that includes:
   a plurality of batteries stacked in a stack direction; and
   an inter-battery separator disposed between two of the plurality of batteries adjacent to each other in the stack direction of the plurality of batteries,
   wherein the inter-battery separator includes:
   a middle member;
   a first side member disposed on a first side of the middle member in the stack direction, the first side member being made of a material that is superior in thermal insulation to the middle member; and
   a second side member disposed on a second side of the middle member in the stack direction, the second side member being made of a material that is superior in thermal insulation to the middle member, wherein a vertical length of the inter-battery separator is smaller than a vertical length of a side face of each of the plurality of batteries, and the vertical length of the side face of each of the plurality of batteries is in a height direction of the plurality of batteries;
   a side heat radiator disposed at a side of the battery stack in a direction orthogonal to both the stack direction and a height direction of the plurality of batteries, the side heat radiator extending in the stack direction, wherein the middle member is in contact with the side heat radiator; and
   a side separator between two of the middle members adjacent to each other in the stack direction, the side separator being disposed along a surface of the side heat radiator adjacent to the battery stack,
   wherein a horizontal length of the middle member is larger than horizontal lengths of the first side member, the second side member and each of the plurality of batteries in a horizontal direction which is perpendicular to the stack direction and the height direction of the plurality of batteries,
   wherein an end of the first side member and an end of the second side member are in contact with the side separator and the first side member and the second side member are separated from the side heat radiator by the side separator, and
   wherein an uncovered region of the middle member by the first side member and the second side member faces the side separator in the stack direction.

2. The battery module according to claim 1, wherein the side heat radiator is a restraint member configured to restrain the battery stack.

3. The battery module according to claim 1, further comprising:
   an external terminal disposed on a first side of each of the plurality of batteries in the height direction, the plurality of batteries being included in the battery stack; and
   a lower heat radiator disposed on a second side of the battery stack in the height direction, the lower heat radiator being made of a metal,
   wherein the middle member is thermally coupled to the lower heat radiator either by direct contact or through a component.

4. The battery module according to claim 1, further comprising:
   the external terminal disposed on the first side of each of the plurality of batteries in the height direction, the plurality of batteries being included in the battery stack; and
   an upper heat radiator disposed on a first side of the battery stack in the height direction, the upper heat radiator being made of a metal,
   wherein the middle member is thermally coupled to the upper heat radiator either by direct contact or through a component.

5. The battery module according to claim 1, wherein
   the middle member is made of aluminum, aluminum alloy, or a graphite sheet, and
   the first side member and the second side member are each made of a heat insulating material that is lower in thermal conductivity than a resin material.

6. The battery module according to claim 5, wherein
   a thickness of the first side member in the stack direction is substantially equal to a thickness of the second side member in the stack direction, and
   a thickness of the middle member in the stack direction ranges from 30% to 50% inclusive of a sum of the thickness of the first side member in the stack direction and the thickness of the second side member in the stack direction.

7. A battery pack comprising the battery module according to claim 1.

8. The battery pack according to claim 7, comprising a housing to house the battery stack including the plurality of batteries stacked,
   wherein part of a component of the housing is a restraint member configured to restrain the battery stack, and
   the middle member is thermally coupled to the restraint member.

9. The battery module according to claim 1, wherein a thickness of the middle member in the stack direction of the plurality of batteries ranges from 40% to 46% inclusive sum of a thickness of the first and second side members in the stack direction of the plurality of batteries.

10. The battery module according to claim 1, further comprising a heat transfer sheet disposed below the plurality of batteries,
    wherein a bottom of the each of the plurality of batteries and a bottom of the inter-battery separator are in contact with the heat transfer sheet.

11. The battery module according to claim 1, wherein the first and second side members are only disposed between two of the plurality of batteries adjacent to each other in the stack direction of the plurality of batteries.

* * * * *